(12) United States Patent
Vaughan et al.

(10) Patent No.: US 12,090,573 B2
(45) Date of Patent: Sep. 17, 2024

(54) FLUID TREATMENT TANK HAVING A LASER WELDED DISTRIBUTOR PLATE

(71) Applicant: Clack Corporation, Windsor, WI (US)

(72) Inventors: Don Vaughan, Waunakee, WI (US); Michael Paquette, Madison, WI (US)

(73) Assignee: Clack Corporation, Windsor, WI (US)

( * ) Notice: Subject to any disclaimer, the term of this patent is extended or adjusted under 35 U.S.C. 154(b) by 929 days.

(21) Appl. No.: 16/406,576

(22) Filed: May 8, 2019

(65) Prior Publication Data

US 2020/0353564 A1    Nov. 12, 2020

(51) Int. Cl.
  *B23K 26/28*   (2014.01)
  *C02F 5/00*    (2023.01)

(52) U.S. Cl.
  CPC .............. *B23K 26/28* (2013.01); *C02F 5/00* (2013.01); *C02F 2201/002* (2013.01)

(58) Field of Classification Search
  CPC ....... B23K 26/244; B23K 26/28; C02F 1/285; C02F 2201/002; C02F 5/00
  See application file for complete search history.

(56) References Cited

U.S. PATENT DOCUMENTS

| | | | |
|---|---|---|---|
| 4,235,340 A | 11/1980 | Clack et al. | |
| 6,379,630 B1 | 4/2002 | Wilfong et al. | |
| 6,589,491 B1 | 7/2003 | Peddicord et al. | |
| 7,354,495 B2 | 4/2008 | Carter et al. | |
| 7,810,670 B2 | 10/2010 | Carter et al. | |
| 7,901,576 B2 | 3/2011 | Stolarik et al. | |
| 7,963,400 B2 | 6/2011 | Stolarik et al. | |
| 8,110,103 B2 | 2/2012 | Mormino et al. | |
| 8,382,994 B2 | 2/2013 | Stolarik et al. | |
| 10,087,086 B1* | 10/2018 | Schmall | E03B 3/11 |
| 10,106,434 B2 | 10/2018 | Vaughan | |
| 2006/0142451 A1* | 6/2006 | Yushina | B29C 65/1635 524/451 |
| 2008/0264847 A1 | 10/2008 | Emerson et al. | |
| 2016/0311694 A1* | 10/2016 | Vaughan | C02F 1/42 |

FOREIGN PATENT DOCUMENTS

| | | | |
|---|---|---|---|
| EP | 0452042 A1 * | 10/1991 | |
| FR | 2469429 A1 * | 5/1981 | |
| GB | 2049134 A * | 12/1980 | ................ B01J 8/28 |

* cited by examiner

*Primary Examiner* — Peter Keyworth
(74) *Attorney, Agent, or Firm* — Boyle Fredrickson S.C.

(57) ABSTRACT

A distributor plate for a fluid treatment tank such as a water softener pressure vessel separates the resin bed from a lower end of the resin tank. The outer peripheral surface of the distributor plate is laser-welded to an inner peripheral surface of the tank. The outer peripheral surface of the distributor plate may have a biasing mechanism that biases the outer peripheral surface of the distributor plate against the inner peripheral surface of the tank. The biasing mechanism may include a plurality of peripherally-spaced resilient fingers extending axially and radially away from a circular base of an outer ring of the distributor plate into engagement with the inner peripheral surface of the tank liner, each of the fingers having a base connected to the base of the ring and having a free end. Also disclosed is a method of making a fluid treatment tank.

14 Claims, 5 Drawing Sheets

FLUID TREATMENT TANK HAVING A LASER WELDED DISTRIBUTOR PLATE

BACKGROUND OF THE INVENTION

1. Field of the Invention

The invention generally relates to fluid treatment tanks and, more particularly, to a tank that has a fluid-permeable distributor plate and that can be easily manufactured and assembled. The invention additionally relates to such a distributor plate and to a method of making a fluid treatment tank including such a distributor plate.

2. Discussion of the Related Art

Fluid-permeable plates, generally known as "distributor plates," are widely used in a variety of fluid treatment tanks. Typical of these tanks are known as "pressure vessels" in which the fluid being treated is pressurized, albeit usually at a low pressure such as residential water line pressure. One such tank is a pressure vessel known as a "resin tank" of a water treatment system. The typical resin tank is a hollow cylindrical structure the interior of which defines a resin bed configured to hold "resin" and water or another liquid therein. The resin may be provided in the form of a plurality of plastic, e.g., polystyrene, beads. The resin bed is separated from the bottom of the tank by a slotted, perforated, or otherwise fluid permeable distributor plate that permits bidirectional fluid flow therethrough, but which prevents resin from falling through the distributor plate. A riser tube may be centrally positioned within the tank. The typical riser tube extends from the distributor plate to an upper opening in the tank through which treated liquid exits the resin tank. The tank may include a blow-molded plastic tank liner reinforced by an outer layer of fiberglass wrap.

Some pressure vessels have distributor plates mounted well-above the bottom of the tank so as to permit a single tank to contain two or more diverse treatment media. Some of upper plates are located in the vicinity of the vertical center of the tank and thus as known as "mid-plate distributor plates" or simply "mid-plates." Some tanks contain two more such plates located well-above the bottom of the tank in a vertically-spaced relationship. For the sake of conciseness, all such plates are referred to herein as "mid-plates", it being understood that the plate need not be located at or near the center of the tank. These mid-plates usually include a cylindrical outer surface that is spin-welded to the interior of the tank's plastic liner. Such plates are described, for example, in U.S. Pat. Nos. 7,901,576 and 8,382,994 to Enpress.

Spin welding involves imparting relative rotation to the components to be welded to generate sufficient frictional heat to the parts at their interface to melt the mating surface of one or both components. Once rotation stops, the material cools and solidifies and fuses the components together, forming a welded assembly. Spin welding necessarily involves holding the two components in close concentric engagement while they are rotated relative to one another. In the case of a water treatment tank mid-plate, spin-welding typically uses a rotating mandrel or spindle that engages the mid plate while the tank liner is held stationary. Spin welding a distributor plate to the interior of a tank liner is difficult or impossible unless the tank liner is open near the plate so as to allow insertion of the mandrel axially into the tank. The Enpress patents discussed herein propose first forming the tank liner, then cutting the tank liner apart in sections to provide an open end near the mid plate, then spin-welding the mid plate to the inner surface of the tank liner, then rejoining the tank liner sections, presumably by thermally bonding them together. The resultant process is time-consuming and equipment intensive. It also risks loss of tank integrity where the cut tank liner sections are rejoined if the welds are imperfect. It also risks misalignment of the rejoined sections unless care is taken to maintain concentricity of those sections during the rejoining process, a condition that can be difficult to meet given the tendency of the liner to become out of round during handling.

The inventor has realized that the need to section tank liners theoretically could avoided by laser welding the tank liner and distributor plate together. Laser welding involves directing a laser beam though a first material that is relatively transparent to the beam to a second material, that is relatively absorbent, so as to heat the second material sufficiently to melt and fuse it to first material upon subsequent cooling. Since the weld energy is imparted through the transparent outer component, that component need not be open in the vicinity of the inner component to accommodate a rotating mandrel or spindle. However, laser welding is similar to spin welding to the extent that requires that the components being welded be held in close engagement with one another during the laser welding process. The inventor has recognized that, in the case of treatment tank mid plate or other distributor plate, incorporating any measures into a welding system that clamps the plate to the tank liner or otherwise holds the plate and the tank liner in engagement with one another would have operate from an open end of the tank liner—just as with a spin welder—negating a major potential benefit of laser welding over spin welding.

The need therefore has arisen to provide a mechanism and/or process for holding an outer peripheral surface of a mid-plate or other distributor plate closely adjacent an inner peripheral surface of a water treatment tank preparatory to and during a laser welding process.

The need additionally has arisen to provide a mechanism and/or a process for welding a distributor plate in a water treatment tank without having to leave an end of the tank adjacent the distributor plate open during the welding process.

The need additional has arisen to provide a water treatment tank with welded distributor plate and a seamless tank in the vicinity of the distributor plate.

SUMMARY

In accordance with a first aspect of the invention, one or more of the above-identified needs is met by providing a fluid treatment tank comprising a tank at least one distributor plate that is configured to support a bed of a fluid treatment media. The thank has an at least generally cylindrical inner surface, and at least one distributor plate received in the tank and configured to separate the bed from a lower end of the tank. The distributor plate has an upper surface, a lower surface, and an outer peripheral surface. The upper surface forms a support surface for fluid treatment media. A plurality of fluid permeable openings are formed through the distributor plate from the upper surface to the lower surface for the passage of a liquid being treated by the treatment media. The outer peripheral surface of the distributor plate is laser-welded to the inner peripheral surface of the tank.

In order to facilitate welding of the distributor plate to the tank, the outer peripheral surface of the distributor plate may have a biasing mechanism that biases the outer peripheral surface of the distributor plate against the inner peripheral surface of the tank.

The distributor plate may be formed of two or more components including an inner fluid permeable disk and an outer ring that supports the disk in the tank. The biasing mechanism may include a plurality of peripherally-spaced resilient fingers extending axially and radially away from a circular base of the support ring into engagement with the inner peripheral surface of the tank liner, each of the fingers having a base connected to the base of the ring and having a free end. The fingers may be spaced from one another at the free ends thereof, in which case a peripheral seal may extend outwardly from the base of the ring and seal against the inner peripheral surface of the tank beneath the free ends of the fingers. Each of the fingers may be curved along at least a majority of a length thereof and have an apex between the base and the free end thereof, the apex engaging the inner peripheral surface of the tank.

The tank may be made of a first material that is relatively transparent to laser light of a designated frequency, and at least an outer peripheral portion of the distributor plate may be made of a second material that is relatively absorbent to laser light of the designated frequency.

In accordance with another aspect of the invention, a method of forming a fluid treatment tank that has a distributor plate constructed at least generally as discussed above is provided. The method includes engaging an outer surface of the distributor plate with an inner peripheral surface of a fluid treatment tank, the distributor plate being configured to separate a bed of treatment media from a lower end of the tank. The distributor plate has an upper surface, a lower surface, and an outer peripheral surface, the upper surface forming a support surface for the fluid treatment media, and a plurality of fluid permeable openings are formed through the distributor plate from the upper surface to the lower surface for the passage of a liquid being treated by the treatment media. The method additionally includes laser-welding the outer surface of the distributor plate to the inner wall of the tank.

The engaging may comprise deflecting a basing mechanism on the distributor plate against the inner peripheral wall of the tank. In this eventuality, the engaging may comprise deflecting a circumferentially-spaced resilient fingers against the inner peripheral wall of the tank, the fingers extending radially and axially away from a base of an outer ring of the distributor plate. The distributor plate may have two or more components including an inner disk and an outer support ring of different materials and that includes the fingers.

Various other features, embodiments and alternatives of the present invention will be made apparent from the following detailed description taken together with the drawings. It should be understood, however, that the detailed description and specific examples, while indicating preferred embodiments of the invention, are given by way of illustration and not limitation. Many changes and modifications could be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings, in which like reference numerals represent like parts throughout, and in which.

DETAILED DESCRIPTION OF THE PREFERRED EMBODIMENTS

Distributor plates constructed in accordance with the invention could be used in a variety of fluid treatment tanks configured to treat a variety of fluids using any of a number of media. Hence, while preferred embodiments of the invention now will be described in conjunction with a resin tank of a water treatment system, it is to be understood that the invention is not so limited.

Figure 1:
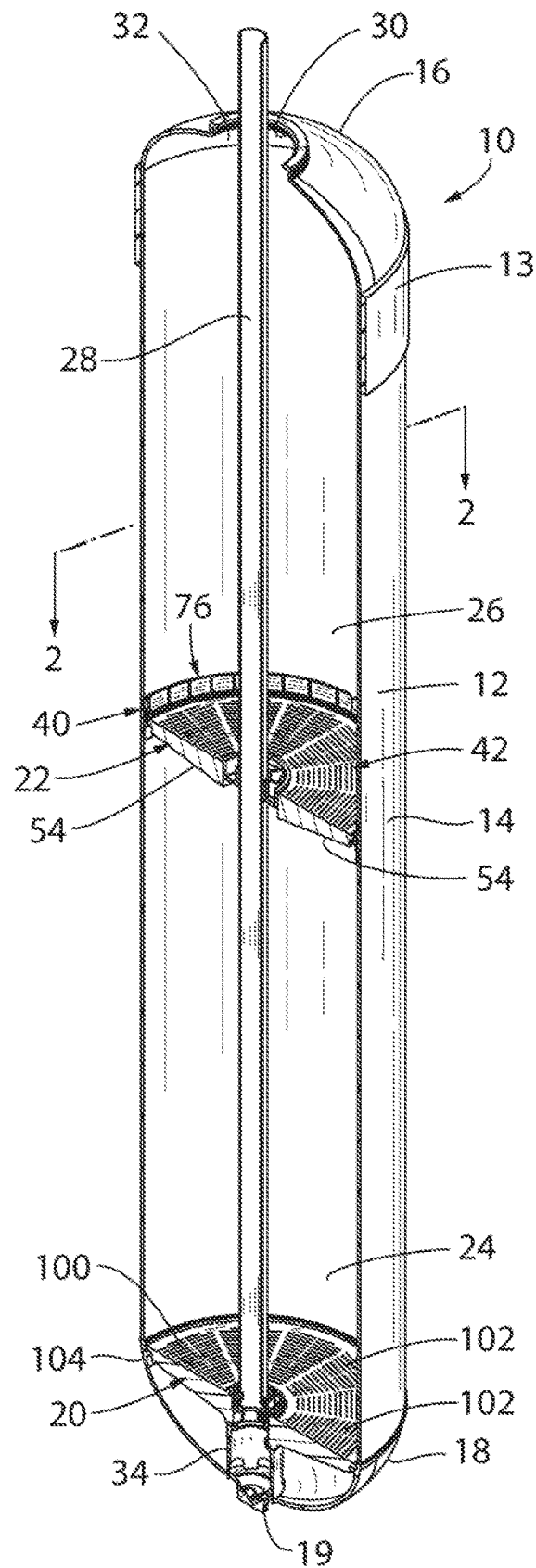
FIG. 1 is a sectional side elevation view of a fluid treatment tank including a distributor plate according to an embodiment of the present invention.

Referring now to the drawings and, initially, FIG. 1, a resin tank 10 includes a tank liner 12 reinforced with wound fiberglass 13 (only a portion of which is shown in FIG. 1). One of variety of water treatment systems with which the resin tank 10 is usable is disclosed in U.S. Pat. No. 6,402,944, the contents which are incorporated herein by reference. It should be noted that, in some applications, the tank need not have an inner liner. The term "tank" therefore should be understood to encompass tanks both with and without an in inner tank liner.

The tank liner 12 is made of a thermoplastic material such as blow-molded high-density polyethylene (HDPE). Liner 12 includes a generally cylindrical hollow body or wall 14 and upper and lower generally semi-spherical top and bottom ends 16 and 18. A feature 19 is integrally molded to the bottom end 18 of the liner 12 to rotationally couple the liner 12 to a filament winding machine during the fiberglass winding process The body 14 may have an internal diameter of, for example, 0.2 m to 1.0 m and a height of 0.5 m to 2 m. The illustrated example has an internal diameter of about 0.25 m. At least one distributor plate is provided in the liner 12 to define a treatment media area thereabove. The illustrated embodiment includes two such plates 20, 22 located near the bottom of the tank 10 and near the center of the tank 10, respectively and defining respective treatment media storage areas 24, 26, thereabove. Each distributor plate 20, 22 has fluid permeable slots or other openings formed through them that are sized and shaped to permit the relatively free flow of the liquid being treated while inhibiting or preventing the ingress of resin beads or other treatment media particles. Each area 24, 26 is configured to receive a bed or layer of a resin or other water treatment media during use of the tank 10. The resin may be provided in the form of a plurality of plastic, e.g., polystyrene, beads. The same or different treatment media may be received in each area 24, 26. The plate 20 is located near the bottom of the tank 10 and can be thought of as a "bottom plate" distributor. The plate 22 is located above the bottom dome 18 and thus can be thought of as a "mid-plate" distributor plate. A riser tube 28 extends vertically through the center of the tank 10 from the beneath the bottom plate 20, extends through center openings in both plates 20 and 22, and extends to or through an upper center upper opening 30 of the tank 10. An annular opening 32 is formed between the outer peripheral surface of the riser tube 28 and the perimeter of the opening 30. An inlet tube 34, positioned beneath the lower end of the riser tube 28, extends downwardly through the bottom distributor plate 20 in communication with the lower end portion of the tank 10. During a water treatment operation, untreated water enters the tank 10 from above through the annular opening 32, flows through the media areas 26 and 24 and the openings in the associated distributor plates 22 and 20 in succession, enters the inlet tube 34, and rises out of the tank 10 through the riser tube 28. This flow may be reversed, for example, during a treatment media generation cycle.

Pursuant to an implementation of the invention, one or both of the distributor plates 20 and 22 is mounted in the tank liner 12 by laser welding. In the illustrated embodiment, the mid-plate 22 is mounted in the tank liner 12 by laser welding, it being understood that, in other implementation\s, the bottom plate 20 and/or still other plates could be mounted in the tank liner by laser welding instead of or in addition to the mid-plate 20.

Figure 2:
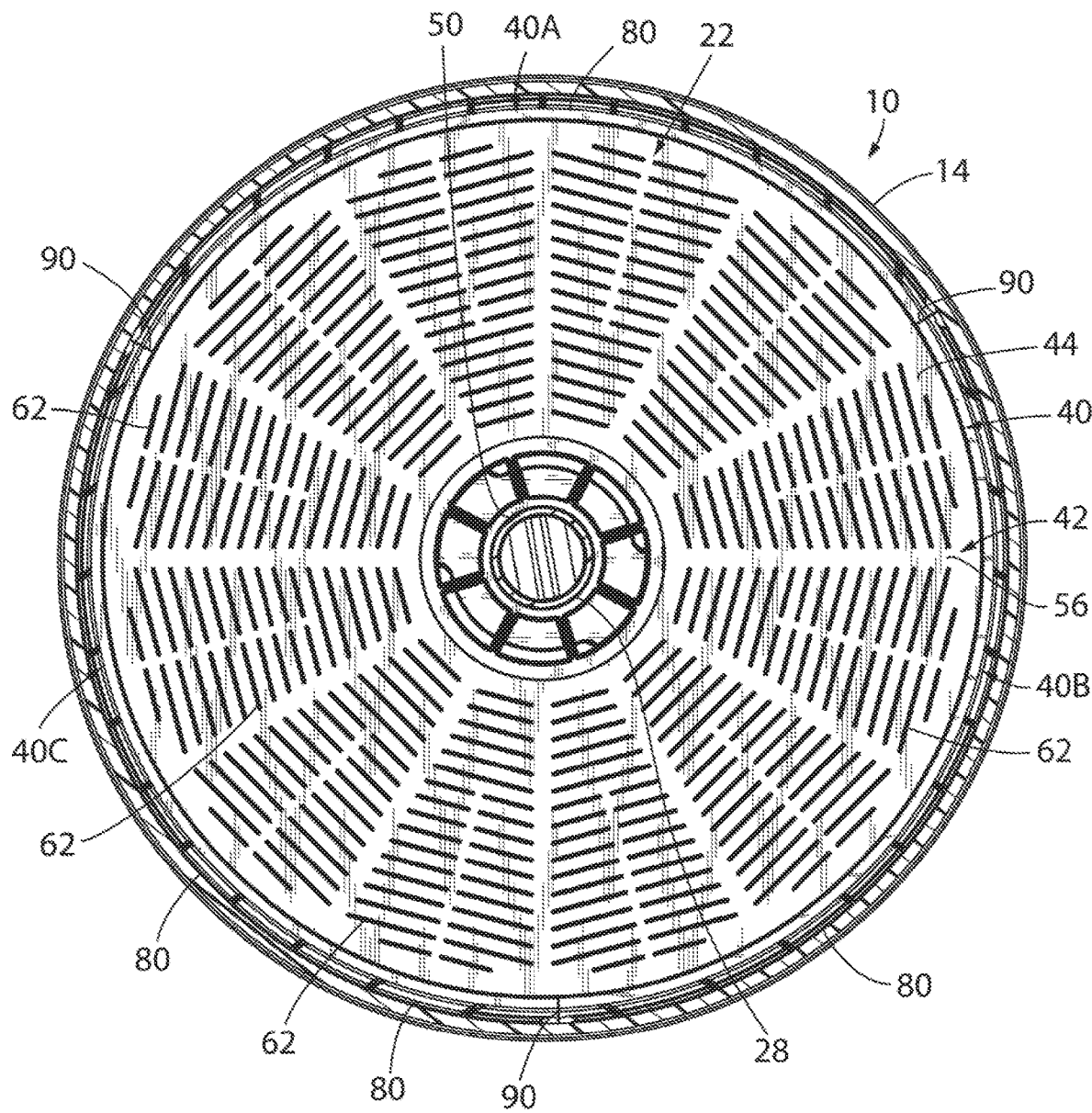
FIG. 2 is a sectional end elevation view of the fluid treatment tank of FIG. 1, taken generally along the line 2-2 in FIG. 1.

With additional reference now to FIGS. 1 and 2, the mid-plate 22 is shown in additional detail. The plate 22 is a two-component assembly including an outer ring 40 mounted on the tank liner wall 14 as described below and an inner disk 42 supported on the ring 40. This two-part distributor plate construction 1) permits the ring 40 to be injection-molded from a thermoplastic material that is relatively-easily thermally-bonded to the tank liner 12 but that has a relatively low dimensional predictability, while 2) permitting the disk 42 to be injection-molded from a thermoplastic material that cannot be easily welded to the material of the tank liner 12 but that has a relatively high dimensional predictability. "Dimensional predictability" in this regard refers to a material that can be injection-molded with fine features of on the order of a less than a centimeter and as fine as a few tenths of a millimeter with close tolerances and with high repeatability on a shot-by-shot basis over a relatively large number of shots. High "dimensional predictability" is generally inversely related to shrink rate and is even more closely inversely related to shrink rate variability. Forming the disk 42 from a material having a relatively high dimensional predictability when compared to that of a material that can thermally bonded to the tank liner 12 permits the slots and other fine features on the distributor plate 20 to be made reliably with close tolerances.

The inner disk 42 of the mid-plate 22 of this embodiment is made from unfilled or glass-filled Noryl® (Noryl® is a registered trademark of Sabic Innovative Plastics IP B.V.), which is family of amorphous reinforced materials in the form of modified polypropylene ether (PPO) resins that are formed from amorphous blends of PPO resin and polystyrene. The characteristics of Noryl and other possible inner disk materials, as well as the design and construction of such disks, are described in great detail in U.S. Pat. No. 10,106,434, the subject matter of which is hereby incorporated by reference in its entirety.

Figure 3:
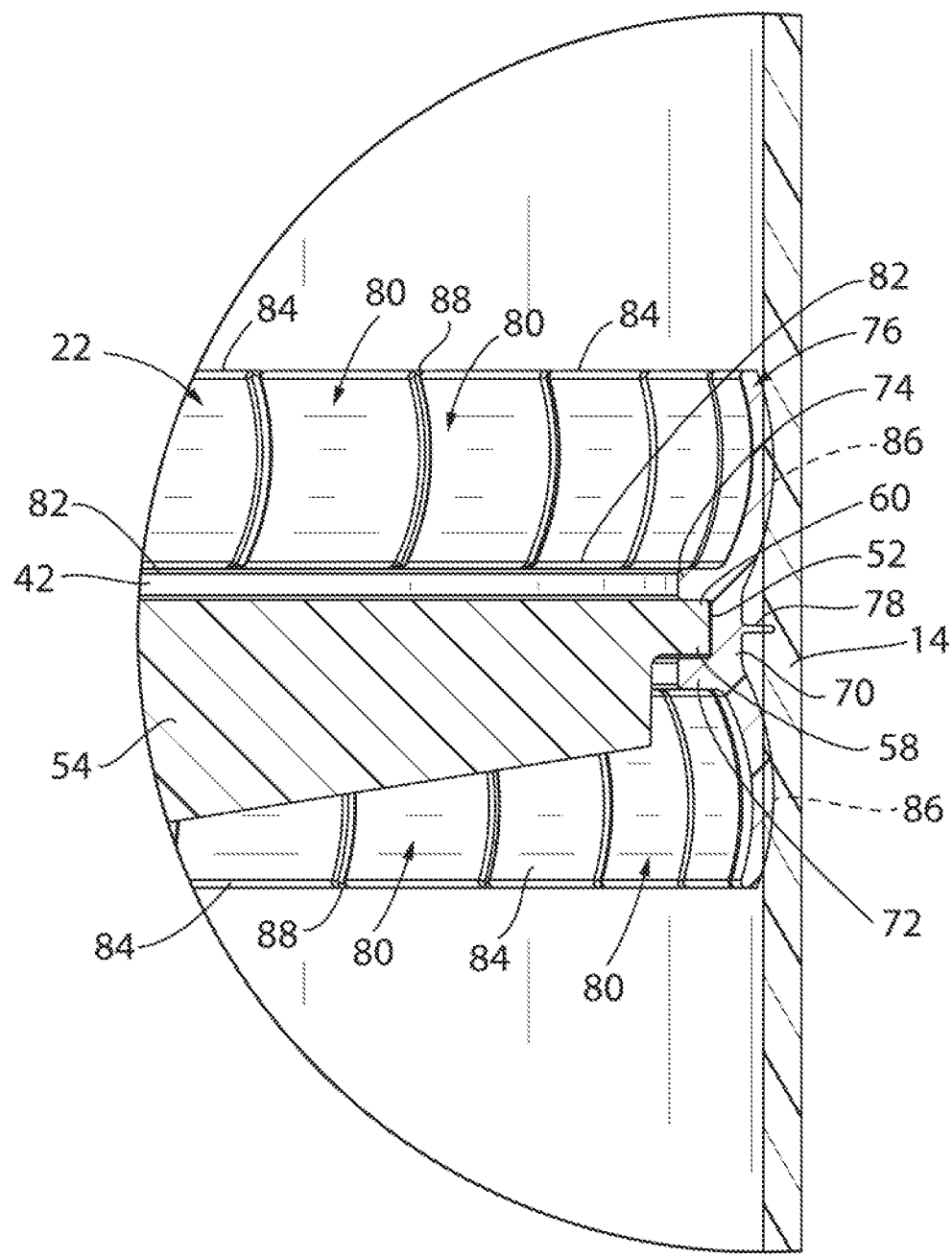
FIG. 3 is a fragmentary isometric view side view of a portion of the pressure vessel, showing the connection of the distributor plate with the inner peripheral wall of a tank liner of the fluid treatment tank.

Referring particularly to FIGS. 1-3, the disk 42 includes upper an upper fluid media support surface 46, a lower surface, a central hub portion 50 through which the riser tube 28 passes, a cylindrical outer radial edge 52, a plurality of circumferentially-spaced reinforcing ribs 54, and a slotted plate portion 56. An annular plug 57 is received in the hub portion 50. The plug 57 engages the periphery of the hub portion at its outer perimeter and the riser tube 28 at its inner perimeter. The slotted plate portion 56 is supported on the ribs 54 and extends from the hub portion 50 to the outer ring radial end 52. The ribs 54 extend at least generally radially from the hub portion 50 to the vicinity of the outer radial edge 52 but stop short of the edge 52 of the disk 42 to form an annular tongue 58 received in an inner groove 60 in the outer ring 40.

Referring now to FIGS. 2-5, the above-described openings are provided in the form of a plurality of slots 62 that are formed in the slotted plate portion 56 of distributor plate 22. The slots 62 are sized, shaped, and orientated to promote uniform fluid flow through the distributor plate 22 and the resin without being clogged with the resin beads or other media particles. The slots 62 could be relatively straight slots that extend either radially or tangentially, or could be curvilinear, such as generally spiral-shaped. The "slot density" or proportion of the total area of all slots 62 to the total area of the slotted plate portion 56 also can vary considerably from application to application. In addition, one or more of the slot size, slot shape, slot orientation, and slot density can vary across the radius of a given slotted plate portion 56 to contribute to a desired flow distribution across the radius of the tank 10. Each slot 62 ideally should be wide enough to permit the fluid being treated and other fluids such as brine to pass therethrough but narrower than the smallest diameter bead or other particle forming the treatment media, it being understood that the diameters of such particles vary greatly and that it is difficult, if not impossible, to design slots or other openings that prevent any particles from falling through.

Figure 4:
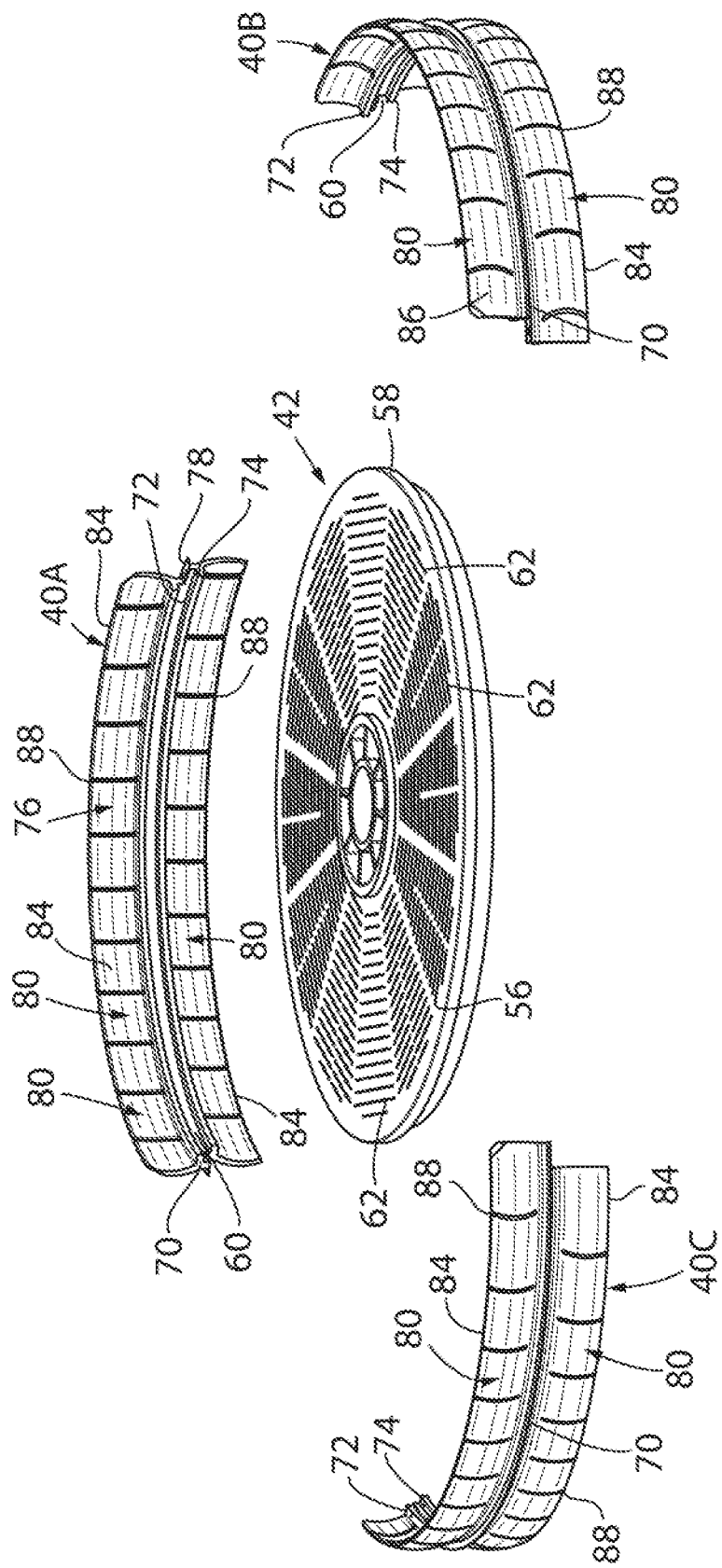
FIG. 4 an exploded isometric review of the distributor plate of FIGS. 1-3.

Still referring to FIGS. 3 and 4, the tank liner 12 and outer ring 40, or at least those portions of the outer ring 40 that are welded to the tank liner 12, are made of materials that are suitable for the laser-welding of the ring 40 to the tank liner 12. In order to make the tank liner 12 and ring 40 from as similar of materials as practical, the tank liner 12 may be made from a material of a molecular weight that is on the high end of the range of suitable molecular weights for blow-molding, and the material of the ring 40 is of a molecular weight that is on the low end of the range of suitable molecular weights for blow-molding that can be injection-molded.

Suitable ring materials are those that are fusible to the tank liner 12 and that are relatively absorbent to laser energy of a wavelength found in laser welders. In the illustrated embodiment in which the tank liner 12 is made of a blow-molded, high-density polyethylene (HDPE) that is relatively transparent to laser energy. One such material is available from Exon Mobile under the PAXON® line and, more specifically PAXON BA53-055. The ring 40 also is preferably made from a high-density polyethylene (HDPE). A suitable material is available from LyondellBasell under the Petrothene® line and, more specifically, Petrothene LT570401. The ring material is impregnated with a material, such as carbon black, that renders it absorbent to laser energy. The laser energy absorbent material may be mixed with the HDPE resin prior to the injection molding process in a percentage sufficient to achieve the desired degree of melting during the laser welding process.

Figure 5:
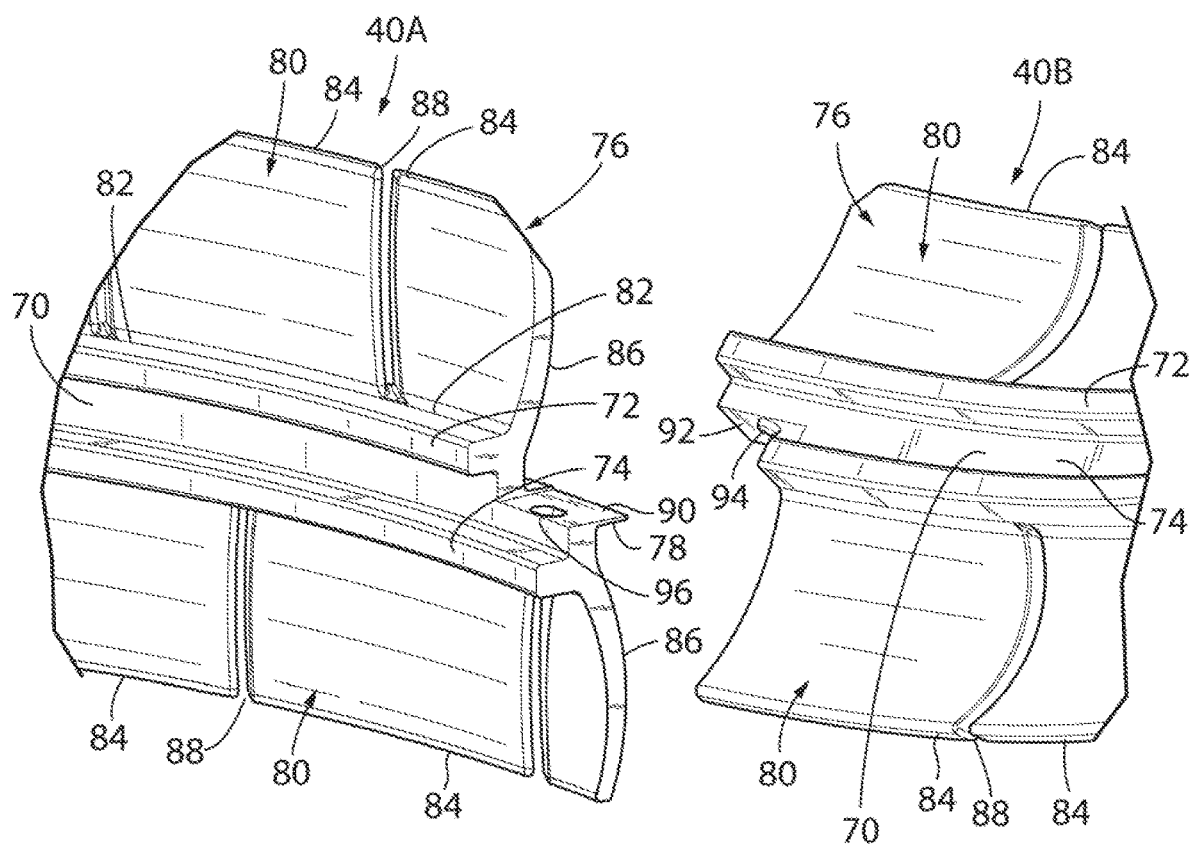
FIG. 5 is an exploded fragmentary perspective view of the mating ends of two ring segments of the distributor plate of FIGS. 1-4.

Referring briefly to FIGS. 4 and 5, the outer ring 40 is formed of a plurality (three in this embodiment) arcuate ring segments 40A, 40B, and 40C connected end to end as described below. Each segment could be formed of two or more interconnected pieces but, in the illustrated embodiment, is formed as a single injection molded component. It thus should be understood that the discussion of the "ring"

that follows refer to the fully-assembled ring 40 formed by interconnecting the ring segments 40A, 40B, and 40C.

Referring to FIGS. 2-5, the ring 40 includes a circular base 70 having an outer peripheral surface, annular horizontal flanges 72 and 74 extending radially inwardly from the base 70 to form the channel 60 therebetween, and a spring mechanism 76 for holding the distributor plate 22 in the tank liner 12 before and during the laser welding operation, and an annular seal 78. The spring mechanism 76 could be formed integrally with or separately from the base 70. It could comprise a single bellows or similar structure extending completely around the mid-plate 22 or two or more spring elements spaced circumferentially of one another. In the illustrated embodiment, the spring mechanism 76 comprises fingers 80 collectively extending around the entire circumference of the distributor plate 22. Two (upper and lower) sets of arcuate fingers 80 are provided in this embodiment, with the sets being symmetrical about a radial bisector of the base 70. Each set contains 30-40 fingers.

Referring especially to FIGS. 3-5, the fingers 80 of this embodiment are molded integrally with the remainder of the ring 40. Each finger 80 has a base 82 merging into the base 70 of the ring 40 and a free end 84 located axially and radially apart from the base 82. Each finger 80 is concave, presenting an apex 86 located between the base 82 and the free end 84. Each finger 80 engages the inner peripheral surface of the tank liner 12 at least at its apex 86, causing the finger 80 to resiliently deflect at its base 80 upon engagement of the with the inner wall of the tank liner 12 and impose a retention force on the tank liner 12. Adjacent fingers 80 could be coupled to one another by reduced-thickness portions of ring material but, in the illustrated embodiment, are spaced by a small gap 88 to enhance the resiliency of the individual fingers 80 and to permit one finger 80 to deflect more than an adjacent finger 80, better-accommodating out of roundness, ridges, or other surface irregularities in the inner peripheral surface of the tank liner 12. In the present embodiment, each finger 80 is 17.5 mm high, measured axially, from base to tip, 28 mm wide, and 1.5 mm thick. Each gap 88 between adjacent fingers 80 is 0.78 mm thick. In the free state of the fingers, the maximum diameter of the ring 40, as measured at the apices 86 of the fingers 80, is greater than the inner diameter of the tank liner body 14 by at least 0.1 cm, more typically on the order of at least 0.3 cm, and possibly on the order of 0.5 cm or more.

Still referring to FIG. 3, the peripheral seal 78 extends outwardly from the base 70 of the ring 40 to seal the ring seals against the inner peripheral surface of the tank liner body 14, preventing fluid and treatment media from flowing through the gaps 88 between the fingers 80 and bypassing the distributor plate 22. The illustrated seal 78 comprises a relatively thin annular flange extending radially from the radial bisector of the ring 40 into engagement with the inner peripheral surface of the tank liner 12. This seal 78 could be formed integrally with the ring 40 as illustrated or could be mounted in the outer peripheral surface of the ring 40.

As mentioned above, the ring 40 is constructed in segments 40A, 40B, 40C so as to permit it to be formed around the disk 42 so as to capture the tongue 58 of the disk 42 in the groove 60 of the ring 40. Each segment 40A, 40B, 40C extends about 120 degrees around the plate 22. Adjacent segments could be connected to one another in any desired manner. As seen in FIGS. 2 and 5, adjacent segments of this embodiment have stepped ends that mate with one another at a stepped seam 90. At the mating ends, one of the segments has a first, upwardly facing flat surface 92, and the mating segment has a second, downwardly facing flat surface 94. A lug or projection 96 on one of the surfaces is received in a pocket or recess 98 in the other surface when the adjacent segments are connected to hold the segments together.

To mount the mid-plate 22 in the tank liner 12, the mid-plate 22 is pre-assembled by connecting the ring segments 40A, 40B, 40C to one another with the tongue 58 on the disk 42 captured in the groove 70 in the ring 40. The plate is then inserted into the cylindrical tank liner body 14 from one of the ends to the desired position. During this process, the fingers 80 deflect to permit axial movement of the mid-plate 22 relative to the tank liner body 14, albeit with some resistance. When the mid-plate 22 is properly positioned in the tank liner body 14, the fingers 80 hold the mid-plate 22 in place, with at least the apices 86 of the fingers 80 firmly engaging the inner peripheral surface of the tank liner body 14. As mentioned above, finger deflection also can accommodate signifying out-out roundness and/or other surface irregularities formed in the inner peripheral surface of the tank liner body 14.

The ring 40 then is laser welded to the tank liner body 14 using a laser welder that transmits laser energy through the tank liner body 14 from the outside. A laser suitable for this process is commercially available from Leister under the NOVALS™ Basic AT name. This laser has a 200W laser line and operates at a wavelength of 975 nm. The laser energy passes through the tank liner body 14 without appreciably heating it and is absorbed in the ring 40, heating at least the outer portions of fingers 80 to above their melting point. When the laser is turned off, the melted material cools, fusing the fingers 80 to the inner peripheral surface of the tank liner body 14 in the vicinity of the apices 86, and possibly elsewhere. The mid-plate 22 now is retained in place with sufficient force to support a bed of treatment media and to withstand the pressures encountered during typical use of the tank 10.

Because laser welding does not require the insertion of a rotating mandrel or comparable structure into the tank liner body 14, the tank liner body 14 need not be cut in the vicinity of the mounting location prior to the welding and rejoined after the welding operation. The tank liner body 14 instead can be seamless between the end domes 16 and 18. Fabrication therefore is substantially simplified when compared to the fabrication of a tank having a mid-plate installed by spin-welding. Tank dimensional reliability and tank integrity also are enhanced due to the lack of any seam along the cylindrical portion of the tank liner body 14.

Referring again to FIGS. 1 and 2, the bottom-plate 20 also has a disk 100 formed Noryl or another material having high dimensional predictability, and has slots 102 formed therethrough that may have the same or similar characteristics of the mid-plate slots 62. The bottom-plate 20 also could have a ring that is laser-welded to the inner periphery of the tank liner, likely at a location just above the bottom dome 18, in the same manner as the mid-plate 22. Alternately, the bottom plate 20 could have a ring 18 that has ends that are fusion bonded to facing ends of the tank liner body 14 and to the bottom dome 18 as described in U.S. Pat. No. 10,106,434, described above and incorporated by reference in its entirety. However, in the illustrated embodiment, an outer ring is omitted in its entirety. The outer peripheral edge of the disk 100 instead rests on a support and is prevented from significant upward movement by a weld bead formed by welding the upper end of the bottom dome 18 to the lower end of the tank liner body 14. That weld bead projects over the upper surface of the disk typically bout about 0.5 mm to 1.0 mm, preventing significant disk upward surface. The support could be formed from a pan or other structure in the dome 18 and/or, as is the case in the illustrated embodiment, by a step or shelf 104 provided in or on the upper end portion of the dome 18.

Although the best mode contemplated by the inventors of carrying out the present invention is disclosed above, practice of the present invention is not limited thereto. It will be manifest that various additions, modifications and rearrangements of the aspects and features of the present invention may be made in addition to those described above without deviating from the spirit and scope of the underlying inventive concept.

For example, distributor plates and tanks as described herein could be used to store fluid treatment media other than resin and could be used to treat fluids other than water.

In addition, it is conceivable that the entire distributor plate, including the fingers or other biasing mechanism, could be formed of a single component formed from a material that can be laser welded to the tank liner, in which case the disk and the attendant openings might not have the same degree of dimensional stability as discussed above.

The scope of some changes to the described embodiments is discussed above. The scope of other changes to the described embodiments that fall within the present invention but that are not specifically discussed above will become apparent from the appended claims.

We claim:

1. A treatment tank assembly for a fluid treatment system, comprising:
    a tank configured to contain a bed of a fluid treatment media and a liquid, the tank having an at least generally cylindrical wall having an inner peripheral surface;
    a distributor plate received in the tank and configured to separate the bed from a lower end of the tank, the distributor plate having an upper surface, a lower surface, and an outer peripheral edge surface, the upper surface forming a support surface for fluid treatment media, a plurality of liquid-permeable slots being formed through the distributor plate from the upper surface to the lower surface,
    wherein the outer peripheral surface of the distributor plate is laser-welded to the inner peripheral surface of the wall of the tank, wherein
    the tank is made of a first material, wherein
        at least an outer peripheral portion of the distributor plate is made of a second material that is more absorbent to laser light of a designated frequency than the first material, and wherein
        the outer peripheral surface of the distributor plate has a biasing mechanism that biases the outer peripheral surface of the distributor plate against the inner peripheral surface of the wall of the tank.

2. The treatment tank assembly of claim 1, wherein the distributor plate has an outer ring having a circular outer base.

3. The treatment tank assembly of claim 2, wherein the distributor plate comprises a disk that is supported on the ring, the disk having the upper and lower surfaces and having the slots formed therethrough, the disk being formed of a different material than the ring.

4. The treatment tank assembly of claim 2, wherein the ring comprises at least two arcuate ring segments connected end to end.

5. The treatment tank assembly of claim 1, further comprising another distributor plate disposed in the treatment tank beneath the distributor plate.

6. A treatment tank assembly for a fluid treatment system, comprising:
    a tank configured to contain a bed of a fluid treatment media and a liquid, the tank having an at least generally cylindrical wall having an inner peripheral surface;
    a distributor plate received in the tank and configured to separate the bed from a lower end of the tank, the distributor plate having an upper surface, a lower surface, and an outer peripheral edge surface, the upper surface forming a support surface for fluid treatment media, a plurality of liquid-permeable slots being formed through the distributor plate from the upper surface to the lower surface,
    wherein the outer peripheral surface of the distributor plate is laser-welded to the inner peripheral surface of the wall of the tank, wherein
    the tank is made of a first material, wherein
    at least an outer peripheral portion of the distributor plate is made of a second material that is more absorbent to laser light of a designated frequency than the first material, wherein
    the outer peripheral surface of the distributor plate has a biasing mechanism that biases the outer peripheral surface of the distributor plate against the inner peripheral surface of the wall of the tank, wherein
    the distributor plate has an outer ring having a circular outer base, and wherein
    the biasing mechanism comprises a plurality of peripherally-spaced resilient fingers extending axially and radially away from the circular base into engagement with the inner peripheral surface of the wall of the tank, each of the fingers having a base connected to the base of the ring and having a free end.

7. The treatment tank assembly of claim 6, wherein the fingers are molded with the ring, and wherein adjacent fingers are spaced from one another at the free ends thereof.

8. The treatment tank assembly of claim 7, further comprising a peripheral seal that extends outwardly from the base of the ring and that seals against the inner peripheral surface of the wall of the tank beneath the free ends of the fingers.

9. The treatment tank assembly of claim 6, wherein each of the fingers is curved along at least a majority of a length thereof and has an apex between the base and the free end thereof, the apex engaging the inner peripheral surface of the wall of the tank.

10. The treatment tank assembly of claim 6, wherein the fingers extend upwardly from the base of the ring, and wherein the biasing mechanism further comprising additional peripherally-spaced resilient fingers extending downwardly and outwardly from the base of the ring into engagement with the inner peripheral surface of the wall of the tank.

11. A treatment tank assembly for a fluid treatment system, comprising:
    a tank configured to contain a bed of a fluid treatment media and a liquid, the tank having an at least generally cylindrical inner wall;
    a distributor plate received in the tank and configured to separate the bed from a lower end of the tank, the distributor plate having an upper surface, a lower surface, and an outer peripheral edge surface, the upper surface forming a support surface for fluid treatment media, a plurality of liquid-permeable slots being formed through the distributor plate from the upper surface to the lower surface, wherein the outer peripheral surface of the distributor plate is laser-welded to the inner wall of the tank, wherein the tank is made of a first thermoplastic material, wherein at least an outer peripheral portion of the distributor plate is made of a second thermoplastic material, the second thermoplastic material being more absorbent to laser light of a designated frequency than the first thermoplastic material, and wherein the distributor plate has a spring mechanism that biases the outer peripheral surface of the distributor plate against the inner peripheral surface of the wall of the tank.

12. The treatment tank assembly of claim 11, wherein the outer periphery of the distributor plate is formed of a HDPE material having carbon embedded therein.

13. The treatment tank assembly of claim 11, wherein the first and second thermoplastic materials are both HDPE materials.

14. The treatment tank assembly of claim 13, wherein the second thermoplastic material is a HDPE material having carbon embedded therein.

\* \* \* \* \*